United States Patent [19]

Townsend

[11] 4,197,348

[45] Apr. 8, 1980

[54] WRAPPED ELONGATED STRUCTURE IN WHICH POSITIONING OF A ONE SIDED ADHESIVE TAPE IS SUCH AS TO PERMIT WRAPPING TO MOVE RELATIVE TO A CORE

[75] Inventor: John M. Townsend, Branford, Conn.

[73] Assignee: Magna-Ply Company, Guilford, Conn.

[21] Appl. No.: 877,865

[22] Filed: Feb. 15, 1978

[51] Int. Cl.[2] ........................ B32B 7/10; B65B 11/08; B65B 11/58; H01B 17/62; H01B 19/00

[52] U.S. Cl. ........................................ 428/377; 57/16; 57/17; 156/56; 156/169; 156/170; 156/171; 156/172; 156/185; 156/187; 156/188; 156/190; 156/391; 156/392; 156/429; 156/430; 156/432; 174/120 R; 174/120 SR; 242/7.01

[58] Field of Search .................. 428/377, 355; 156/56; 57/16, 17; 174/120 R, 120 SR

[56] References Cited

FOREIGN PATENT DOCUMENTS 38-24243 11/1963 Japan ........................................ 428/355

*Primary Examiner*—J. C. Cannon
*Attorney, Agent, or Firm*—Kenyon & Kenyon

[57] ABSTRACT

The disclosure relates to a construction for a wrapped elongated structure, a method of manufacturing an apparatus to manufacture the wrapped elongated structure. The wrapped elongated structure has an elongated core. An adhesive tape having one adhesive surface is applied to the surface of the core along the length thereof with the adhesive surface facing away from the core. Tape wrapping is spirally wrapped around the core and the applied adhesive tape in order that each turn of the tape wrapping contacts the adhesive surface of the adhesive tape. The adhesive tape secures the tape wrapping in its spiral form with respect to the elongated core. The wrapped elongated structure may also structure may also included an elongated core, a first tape wrapping spirally wrapped around the core, an adhesive tape having two adhesive surfaces applied on the spiral first tape wrapping, and a second tape wrapping spirally wrapped around the adhesive tape. Each turn of the first tape wrapping contacts the first adhesive surface of the adhesive tape and each turn of the second tape wrapping contacts the second adhesive surface of the adhesive tape to maintain the wrappings in their spiral form with respect to one another and the core.

16 Claims, 11 Drawing Figures

WRAPPED ELONGATED STRUCTURE IN WHICH POSITIONING OF A ONE SIDED ADHESIVE TAPE IS SUCH AS TO PERMIT WRAPPING TO MOVE RELATIVE TO A CORE

BACKGROUND OF THE INVENTION

1. Field of the Invention

The invention relates to a spirally wrapped elongated structure, a method of manufacturing the wrapped elongated structure and an apparatus for manufacturing the wrapped elongated structure. More particularly, the invention relates to an electrical conductor core spirally wrapped with insulating tape which is in contact with an adhesive tape extending along the core, a method of wrapping an electrical conductor core with insulating tape in contact with adhesive tape and an apparatus for wrapping an electrical conductor core with insulating tape in contact with adhesive tape. The adhesive tape adheres to the spirally wrapped insulating tape and thereby maintains the spiral formation of the insulating tape during forming or cutting of the conductor.

2. Descriptions of the Prior Art

Conductors spirally wrapped with tape material are commonly usd in electrical equipment. More in particular windings of power transforms can comprise conductors which are spirally wrapped with layers of insulating tape. Thus, in a typical application the wrapped conductors are separated by the wrapping and are electrically insulated from one another by the tape wrapping and by transformer oil surrounding the conductors. In such an application the tape material can be rope fiber which comprises approximately 90% hemp material and 10% pulp material, draft paper, or other suitable insulating materials. Thermally upgraded rope fiber material and various other papers which can withstand a moderately high temperature rise can also be used. In addition, where higher temperatures are encountered, the conductors can be wrapped with tape insulating material, which consists of nylon fibers, a type of which is marketed by E.I. DuPont DeNemours of Wilm., Del., under the trademark NOMEX.

The prior art commonly discloses conductors wrapped in insulating tape. In U.S. Pat. No. 3,886,316 which issued on Feb. 18, 1975 to Takechi et al, a conductor is insulated by placing a string of resin material extending along the length of the conductor, spirally wrapping the conductor and string with insulating tape, impregnating the wrapped conductor with resin material and heating the conductor to fuse the string with the impregnating resin. The resin string served to create interstices in the wrapping to collect resin. After heat treatment, the impregnated resin, the resin string and the wrapping become a solid insulating layer. U.S. Pat. No. 3,575,748 issued to Polizzano teaches a method for insulating conductors wherein a narrow tape placed along the length of a conductor and the conductor is enveloped in an insulating sleeve with the longitudinal edges overlapping on the narrow tape. The overlapping edges and the narrow tape are then heat sealed to form a solid insulating layer.

The prior art also includes U.S. Pat. No. 3,873,396 which issued on Mar. 25, 1975 to Rice. This patent shows a method for coating a pipe by spirally wrapping a web around the outside of the pipe. As the web is wrapped, an adhesive is applied to one edge of the top surface of the web in order that the layer of adhesive is interposed between the top side of one wrap of tape and the bottom side of the next overlapping wrap of tape. This construction holds the tape in its spiral orientation around the pipe and prevents separation of adjacent wraps of tape. Thus, a solid layer is formed around the pipe.

U.S. Pat. No. 3,687,778 issued on Aug. 29, 1972 and U.S. Pat. No. 3,761,335 issued on Sept. 25, 1973, each to Chichoski et al, teach the applying of an adhesive to the outside surface of a tubular member and then spirally wrapping the member with a webbing. The adhesive on the outside surface of the tubular member causes the webbing to adhere directly to the tubular member and form a solid layer of webbing around the tubular member.

The prior art also teaches methods of creating tubular articles from spirally wound webs. U.S. Pat. No. 3,468,733 which issued on Sept. 23, 1969 to Dunlap, Jr. et al discloses a method of making tubular articles by spirally winding a narrow one-sided adhesive strip around a mandrel with the adhesive facing away from the mandrel and spirally winding a paper strip on the same mandrel over the adhesive strip. The adhesive strip underlies the edges of two adjacent wraps of paper webbing and thereby holds the tubular shape of the article.

U.S. Pat. No. 3,457,130 which issued on July 22, 1969 to Morrison discloses a method and apparatus for making tubular articles from spirally wound paper tapes. In Morrison, a narrow strip of thermoplastic material is spirally wound around the mandrel underlying adjacent edges of spirally wound plies of paper thermoplastic laminates. The outside surface of the thermoplastic materials when heated effects a bond between the edges of adjacent strips of material to bind the object in its tubular shape.

SUMMARY OF THE INVENTION

An object of the invention is to wrap a conductor with an insulative spiral wrapping that is flexible and will not break or expose the conductor when the conductor is bent.

Another object of the invention is to provide a conductor with an insulative spiral wrapping that is held in a spiral form without being attached to the conductor.

A further object of the invention is to provide an apparatus for spirally wrapping a conductor with an insulative wrapping which will not break or expose the conductor core when the conductor is bent.

The invention relates to a first wrapped elongated structure having an elongated core, an adhesive tape having one adhesive surface with the adhesive surface facing away from the core, and a tape wrapping spirally wrapped around the core and the adhesive tape means with each turn of tape wrapping contacting the adhesive surface of the adhesive tape.

The invention relates to the method of making the first elongated structure which comprises the steps of supporting and advancing the elongated core along a predetermined line, applying an adhesive tape having one adhesive surface to the length of the elongated core with the adhesive surface facing away from the core, and spirally wrapping the elongated core and the adhesive tape with a tape wrapping with each turn of the tape wrapping contacting the adhesive surface of the adhesive tape.

The invention relates to an apparatus comprising a means for supporting an elongated core and advancing it in a predetermined direction, a means for applying adhesive tape having one adhesive surface to the length of the elongated core with the adhesive surface facing away from the elongated core, and a means for spirally wrapping the elongated core and adhesive tape means with a tape wrapping in order that each turn of the tape wrapping contacts the adhesive surface of the adhesive tape.

The invention relates to a second wrapped elongated structure having an elongated core, a first tape wrapping spirally wrapped around the elongated core, an adhesive tape having two adhesive surfaces applied to the first tape wrapping parallel to the elongated core and a second tape wrapping spirally wrapped around the elongated core, the first tape wrapping means and the adhesive tape. The first adhesive surface of the adhesive tape contacts each turn of the first tape wrapping and the second adhesive surface of the adhesive tape contacts each turn of the second tape wrapping. As a result, the adhesive secures each of the tape wrappings in a spiral form even when the elongated structure is formed or severed.

The invention relates to a method and apparatus for making the second wrapped elongated structure.

The invention relates to a third wrapped elongated structure having an elongated core, an adhesive tape having one adhesive surface spirally wrapped in one sense of rotation around the elongated core with the adhesive surface facing away from the elongated core, and a tape wrapping spirally wrapped around the elongated core and adhesive tape in the opposite sense of rotation with each turn of the tape wrapping contacting the adhesive surface of the adhesive tape.

The invention relates to a method and apparatus for making the third elongated structure.

The invention also relates to a wrapped elongated structure which is an insulated electrical conductor wherein the elongated structure is an electrically conductive core and the tape wrapping means is insulating tape.

BRIEF DESCRIPTION OF THE DRAWINGS

FIG. 3 is a vertical section view of the spirally wrapped conductor of the invention taken along lines 3—3 in FIG. 2;

DESCRIPTION OF THE INVENTION

The invention relates to wrapped elongated structures, as well as methods and apparatus for wrapping the structure. The description is directed to an electrical conductor wrapped with adhesive tape and insulating tape; however, the invention is not restricted to an electrical conductor since the method and apparatus disclosed and the article produced thereby can relate to any wrapped elongated structure.

Figure 1:
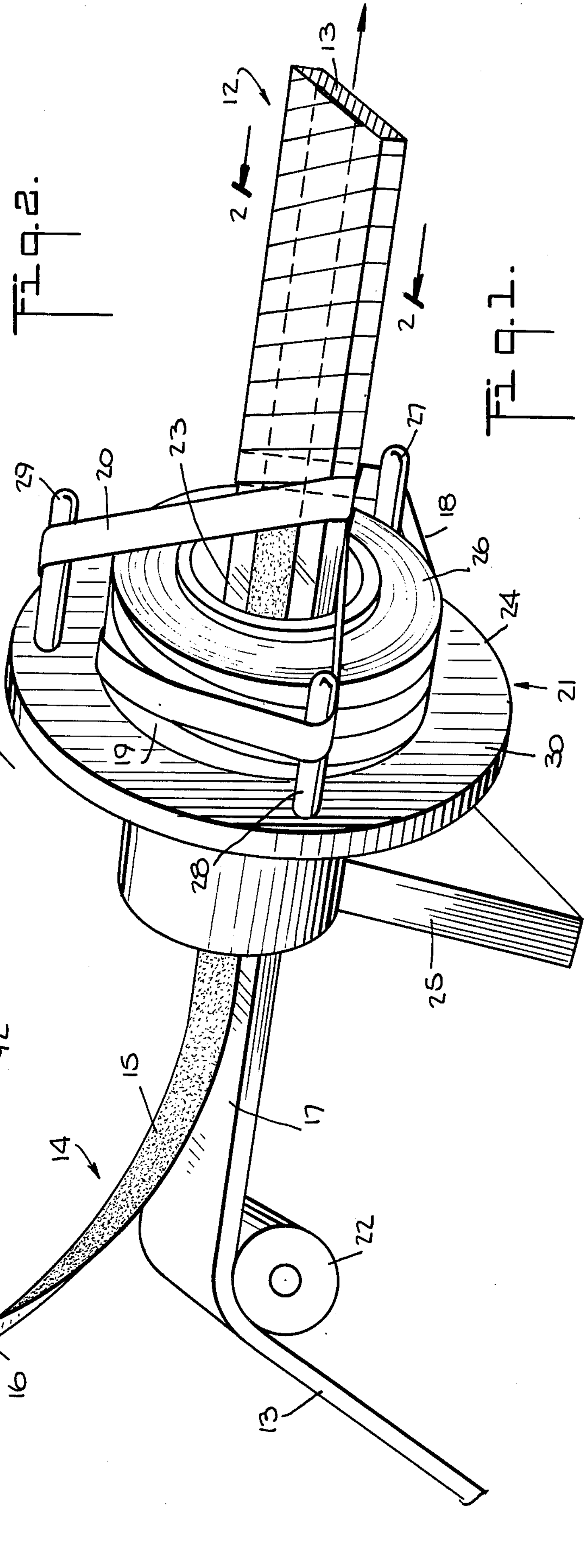
FIG. 1 is a perspective view of the apparatus of the invention for applying an adhesive tape and a plurality of insulating tapes to a rectangular conductor core.

As shown in FIG. 1, a wrapped elongated structure 12 comprises an electrically conductive core 13 which is spirally wrapped with insulating tapes. Conductor core 13 has a rectangular cross-section which is fed from a supply such as a reel (not shown). An adhesive tape 14 is directed onto the upper surface 17 of the length of the core 13, as viewed in FIG. 1, from an adhesive tape supply (not shown). Adhesive tape 14 has an upper adhesive surface 15 and a lower non-adhesive surface 16. Adhesive tape surface 15 can comprise an adhesive applied to tape 14 such as a contact adhesive, a pressure sensitive adhesive, or a heat-activated adhesive. Adhesive tape surface 16 being non-adhesive does not bond to upper surface 17 of core 13.

Multiple insulating tapes 18, 19, 20 are spirally wound around the core 13 simultaneously in an overlapping manner by winding apparatus 21. Since tapes 18, 19 and 20 are spirally wound on core 13 in an overlapping manner, a portion of each turn of each of insulating tapes 18, 19 and 20 contacts adhesive surface 15 of adhesive tape 14. As a result the adhesive tape secures tapes 18, 19 and 20 in an overlapping spiral orientation around core 13.

U.S. Pat. No. 4,024,696, issued May 24, 1977, discloses a method and apparatus for wrapping multiple tapes about an elongated structure. Such method and apparatus can be used in carrying out this invention. U.S. Pat. No. 3,997,122, issued on Dec. 14, 1976, discloses a supply package of multiple tapes which can be used in carrying out this invention.

Core 13 is taken from a supply and then supported by a roller 22. The core is then advanced along a predetermined line by a feeding mechanism (not shown) through opening 23 in winding head 24 of winding machine 21. The opening 23 extends completely through winding head 24 mounted on base 25. A drive means (not shown) rotates winding head 24 in a clockwise direction about an axis of rotation coextensive with the predetermined line of advancement of core 13 and coaxial with opening 23.

A plurality of insulating tapes 18, 19 and 20 to be wrapped about the core are supplied by a traverse wound tape package 26 which is coaxially mounted on winding head 24. Winding head 24 has a planar face 30 perpendicular to the axis of rotation of winding head 24. A plurality of guide member 27, 28, 29 extend outwardly from face 30 of winding head 24. Guide members 27, 28 and 29 are disposed circumferentially spaced apart from one another adjacent the periphery of winding head 24. The guide members 27, 28 and 29 separate tapes 17, 18 and 19, respectively, from the tape supply package 26 at different predetermined locations adjacent the periphery of the package 26 for winding about core 13. Insulating tapes 18, 19 and 20 are spirally wound around core 13 at a helical angle determined by the forward linear motion of core 13 through opening 23 and the rate of rotation of winding head 24.

Figure 2:
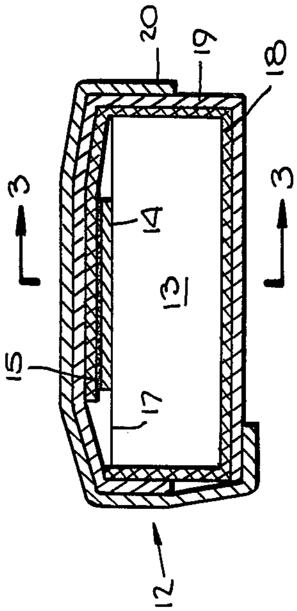
FIG. 2 is a vertical section view of the spirally wrapped conductor of the invention taken along lines 2—2 as shown in FIG. 1.

A cross-section view of wrapped conductor 12 taken along section line 2—2 in FIG. 1 can be seen in FIG. 2. As seen in FIG. 2, adhesive tape 14 lies on the surface 17 of core 13 with the adhesive surface 15 of tape 14 facing away from core 13. Wrapped around both core 13 and adhesive tape 14 are spirally wound insulating tapes 18, 19 and 20. Since each turn of insulating tapes 18, 19 and 20 contact adhesive surface 15 of tape 14, the tapes are held by tape 14 in a spiral configuration.

A transverse section view of wrapped conductor 12, as taken along section line 3—3 of FIG. 2, is seen in FIG. 3. Adhesive tape 14 lies on surface 17 of core 13. Since bottom surface 16 of adhesive tape 14 has no adhesive, the bottom surface does not bind to surface 17 of core 13. Insulating tapes 18, 19 and 20 are shown in FIG. 3 to be spirally wrapped around core 13 and adhesive tape 14. Each of tapes 18, 19 and 20 on each turn around the core has three portions, 18*a*, 18*b*, 18*c*; 19*a*, 19*b*, 19*c*; and 20*a*, 20*b*, 20*c*, respectively. Portions 18*a*, 19*a*, and 20*a* cross over and are directly in contact with adhesive surface 15 of adhesive tape 14. Portion 18*b* overlaps portion 19*a*; portion 18*c* overlaps portions 19*b* which in turn overlaps portion 20*a*. Thus with this construction, a portion of each of the three tapes 18, 19 and 20 is in contact with adhesive strip 14. If conductor 12 and insulator tapes 18, 19 and 20 should be severed, the spirally wrapped tapes are prevented from unraveling since each turn of tape around the core 13 and adhesive tape 14 is held in place by adhesive surface 15. The contact of portions 18*a*, 19*a*, and 20*a* with adhesive tape 14 also prevents relative movement between each winding of tapes 18, 19 and 20 at their point of contact with adhesive tape 14. As a result the tape wrapping remains in its overlapping form even if the core is formed into a bend having a relatively small radius.

Figure 8:
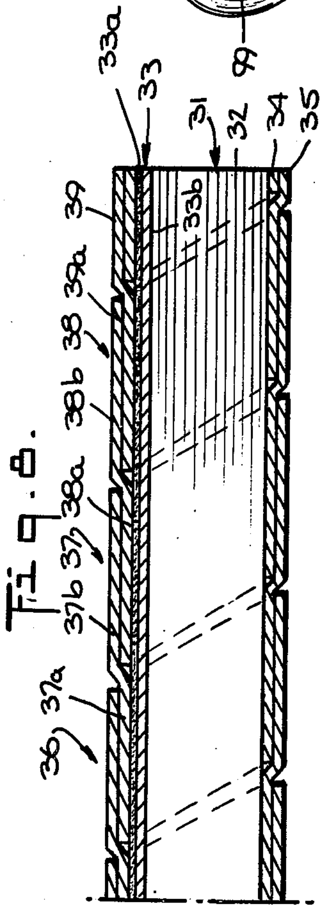
FIG. 8 is a vertical section view taken along the length of the wrapped conductor shown in FIG. 1.
Figure 9:
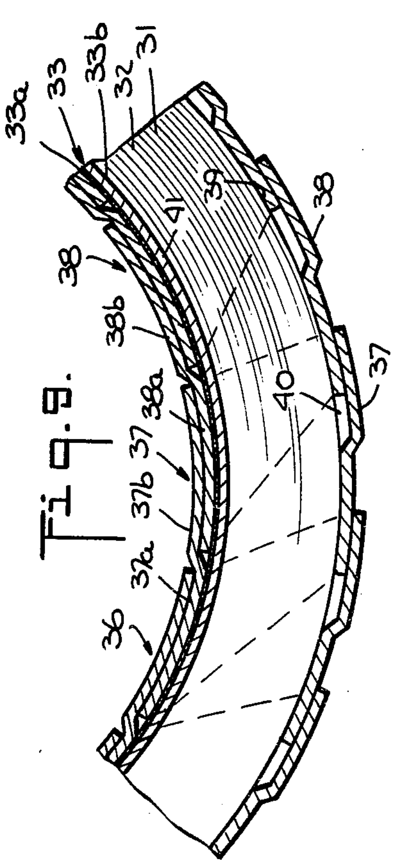
FIG. 9 is a vertical section view showing the wrapped conductor of FIG. 8 when formed into a bend.

Another advantage of the invention is seen in FIGS. 8 and 9. FIG. 8 shows a conductor 31 having an electrically conductive core 32, an adhesive strip 33 having an adhesive surface 33*a* and a non-adhesive surface 33*b*, and a spirally wound insulation comprising overlapping strips 34 and 25. On each turn around core 32 and adhesive strip 33, a portion 37*a* and 38*a* of turns 36, 37 and 38, respectively, are disposed immediately adjacent the core 32 and contact adhesive side 33*a* of adhesive strip 33. In this way the adhesive strip can hold the strips 34 and 35 in place. Portion 37*b* overlies portion 38*a* and portion 38*b* overlies portion 39*a* of turn 39. When the conductor 31 is formed or bent as shown in FIG. 9, the portions 37*a* and 38*a* of turns 37 and 38 in contact with adhesive surface 33*a* of adhesive tape 33 are held in position relative to one another by the adhesive tape surface 33*a*; however, the wraps of tape on the opposite side of core 31 are not held in position and may spread to accommodate the arcuate length of increased surface 39 of core 31. Upon bending conductor 31, displacements of the tapes occur, for example, as shown in FIG. 9 in region 40 between turns 37 and 38, as the turns of tape slide over one another. Since the tape turns 37 and 38 can move one with respect to the other and since the tape turns are not attached to the core 31 as a solid insulating layer, the insulating tapes will not be damaged or cracked and will not expose the core. Furthermore adhesive tape 32, having no adhesive on surface 35 facing core 32, can also be displaced with respect to the core in accommodating changes in the length of surface 41 of core 32.

Figure 4:
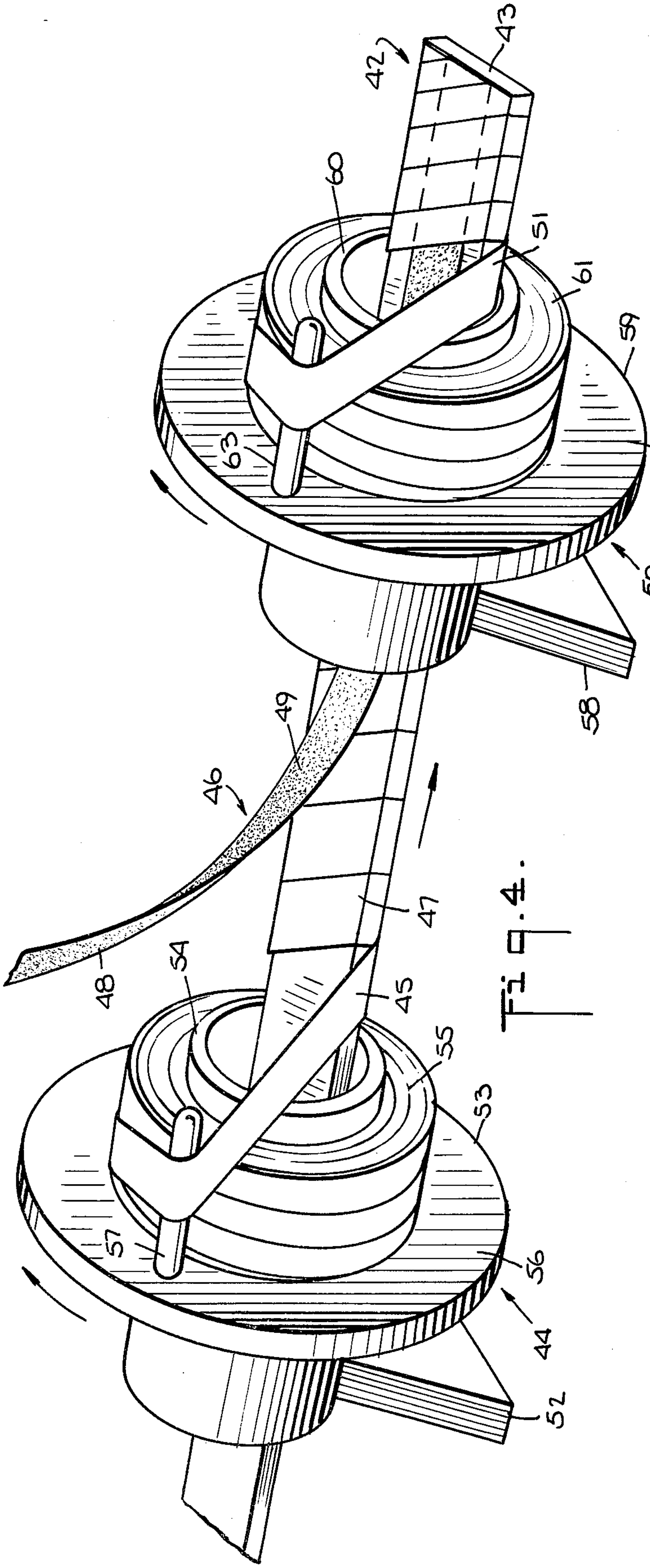
FIG. 4 is a perspective view of the apparatus of the invention for applying a first spirally wound insulating tape to a rectangular conductor core, an adhesive tape along the length of the tape, and a second spirally wound insulating tape about the first tape and the adhesive tape.

As shown in FIG. 4, a conductor 42 has an electrically conductive core 43 with a rectangular cross-section. The core is supported and linearly advanced along a predetermined line by a feeding means (not shown) into the winding apparatus from a core supply (not shown). As the core 43 passes through winding head 44, a first tape wrapping means, insulating tape 45 is spirally wrapped about and immediately adjacent to the core 43 by winding head 44. As a result each turn of tape 45 partially overlaps the preceding turn. From an adhesive tape supply (not shown), adhesive tape 46 is applied, parallel to the length of core 43, on the surface 47 of spirally wound tape 45. Adhesive tape 46 has a first adhesive surface 48 and a second adhesive surface 49. Adhesive surface 48 of adhesive tape 46 is applied to the surface 47 of spirally wound tape 45 such that each turn of tape 45 is in contact with surface 48 of adhesive tape 46 and held in its spiral position.

Core 43 having spirally wound tape 45 and adhesive tape 46 then is advanced through winding means 50. As the core 43 is advanced linearly through winding means 50, a tape wrapping means, i.e., insulating tape 51, is spirally wrapped around core 43, insulating tape 45 and adhesive tape 46. As insulating tape 51 is wrapped, each turn of insulating tape overlies a portion of its preceding turn. As the insulating tape is wrapped, a portion of tape 51 on each turn around core 43, spirally wrapped insulating tape 45 and adhesive tape 46, contact adhesive surface 49 of adhesive tape 46 and be held in its spiral orientation.

As shown in FIG. 4, winding means 44 has a base 52, an annular winding head 53 rotatably mounted on base 52 with an opening 54 therein to accommodate the passage of core 43 through winding head. Winding head 53 is rotated by a drive means (not shown) in a clockwise direction about an axis of rotation which is parallel to the predetermined line along which core 43 is advanced. A tape supply 55 of insulating tape 45 is coaxially mounted on face 56 of winding head 53. Face 56 is a planar surface perpendicular to the axis of rotation of winding head 53. Insulating tape 45 is separated from tape supply 55 by a guide member 57 which is mounted on face 56 of winding head 53 adjacent is periphery.

Winding means 50 has a base 58 upon which a winding head 59 is rotatably mounted. Winding head 59 has an opening 60 through which core 43 passes as the core is spirally wrapped with insulating tape 51. The winding head 59 is rotated by a drive means (not shown) in a clockwise direction about an axis or rotation parallel to the predetermined line along which core 43 is advanced. A planar face 62 of the winding head extends perpendicular to the axis of rotation of the winding head. A tape supply 61 containing insulating tape 51 is coaxially mounted on face 62 of winding head 59. A guide member 63 is mounted on face 62 of winding head 59 adjacent its periphery. Guide member 63 separates tape 51 from tape supply 61 for spiral wrapping about core 43, spirally wrapped tape 45 and adhesive tape 46.

Each of winding means 44 and 50 may employ a tape supply having a plurality of insulating tapes and a plurality of guide means disposed adjacent the periphery of their respective winding heads 53 and 59. A plurality of guide means act enable winding means 44 to spirally wrap a plurality of tapes simultaneously about core 43 and winding means 50, spirally wrap a plurality of insulating tapes simultaneously about core 43, adhesive tape 46 and the first layer of spirally wrapped tapes.

The helical angle at which tape 45 is spirally wrapped around core 43 is determined by the rate of rotation of winding head 53 and the speed with which core 43 is advanced through opening 54. The helical angle at which tape 51 is spirally wrapped around core 43 is determined by the rate of rotation of winding head 49 and the speed with which core 43 is advanced through opening 60.

Figure 5:
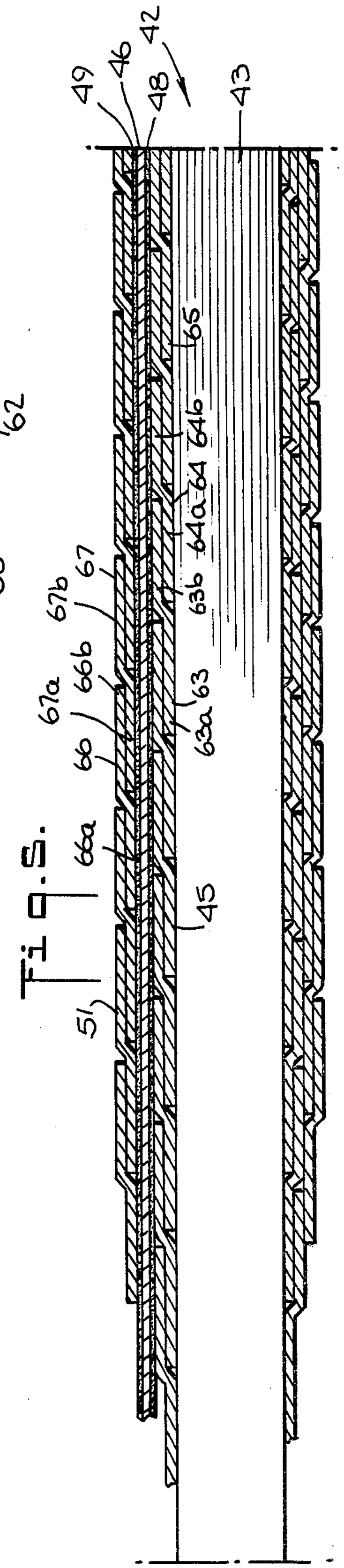
FIG. 5 is a vertical section view of the length of the spirally wrapped conductor of the invention shown in FIG. 4.

A transverse section of the conductor 42 of FIG. 4 is shown in FIG. 5. Insulation tape 45 is spirally wrapped around and immediately adjacent to core 43. Two adjacent turns 63 and 64 of tape 45 have a portion, *63a* and *64a*, immediately adjacent, but unbonded to the surface 65 of core 43, and a portion *63b* and *64b*, respectively. Portion *63b* overlies section *64a*. Adhesive surface 49 overlies the windings of insulating tape 45 and is in contact with a portion of each turn of tape 45 around the core, here exemplified by portions *63b* and *64b* of tape turn 63 and 64, respectively.

Insulating tape 51 is spirally wrapped around core 43, insulating tape 45 and adhesive tape 46. Each turn of insulating tape 51 partially overlaps the adjacent turn of tape 51 as shown by turns 66 and 67 of insulating tape 51 in FIG. 5. Turns 66 and 67 have portions *66a*, *66b* and *67a*, *67b*, respectfully. Portions *66a* and *67a* contact adhesive surface 49 of adhesive tape 45 and are thereby held in their spiral orientation. Portion *66b* overlies portion *67a* in its spiral orientation.

The advantage of this embodiment of the invention is that the insulating tape is not bonded to the surface of the core and may move relative to the core surface when the conductor is formed or bent. Since the insulating tapes are bound together by adhesive strip 46 only along the top portion of the conductor, the adjacent turns of spirally wound insulating tapes 45 and 51 can spread relative to each other to cover the curved surface of the core 43 when it is bent. Thus upon bending the core, the insulating layer does not crack or expose the core as would a solid insulating layer.

A further advantage of this embodiment is that if the conductor is cut, the spirally wound insulating tapes 45 and 51 will not unwrap since each turn of the tapes is in contact with an adhesive surface of adhesive tape 46.

Figure 6:
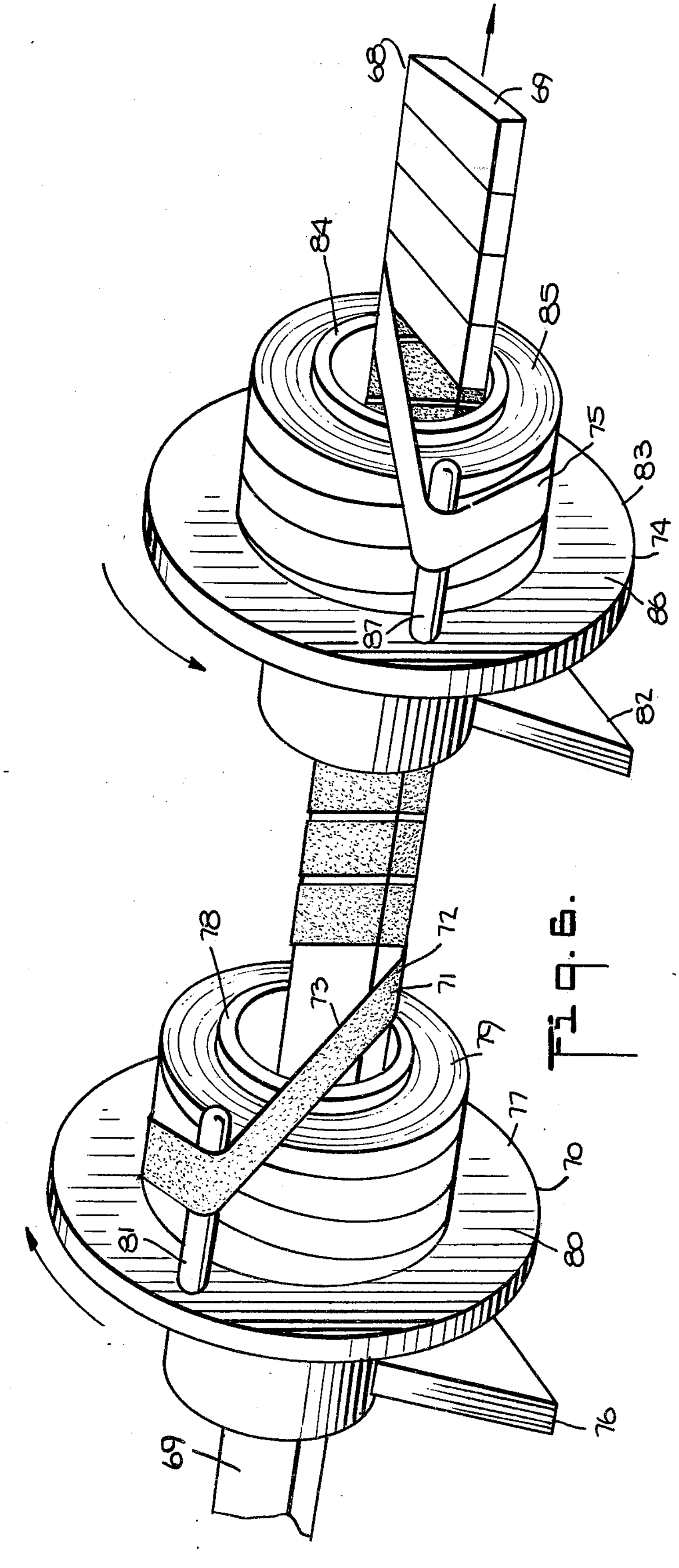
FIG. 6 is a perspective view of the apparatus of the invention for spirally wrapping adhesive tape and subsequently spirally wrapping insulating tape around a rectangular conductor core.
Figure 7:
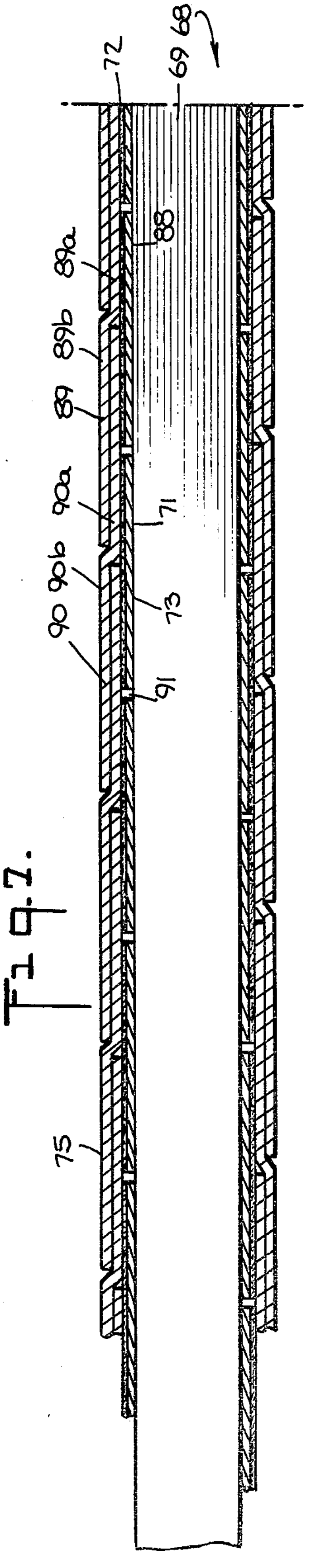

A third embodiment of the invention and an apparatus for manufacturing it is shown in FIG. 6. An electrical conductor 68 is made by supporting and advancing an electrically conductive core 69, having a rectangular cross section, along a predetermined line by feed means (not shown) extending from a core supply (not shown) and through a winding means 70. An adhesive tape 71 is spirally wound in a clockwise rotation about core 69. Adhesive tape 71 has both an adhesive surface 72 formed by any one of a contact adhesive, a pressure sensitive adhesive, or a heat-activated adhesive and a non-adhesive surface 73. Adhesive tape 71 is spirally wound with a given direction of rotation around core 69 with the adhesive surface 72 facing away from the core 69.

Core 69, having a spiral wrapping of adhesive tape 71, is then linearly advanced through winding means 74 in which a tape wrapping means applies insulating tape 75 spirally with a counterclockwise rotation, a direction of rotation opposite that of spirally wrapped adhesive tape 71. Insulating tape 75 is wrapped with each turn of tape 75 partially overlapping the preceding turn of tape 75.

Winding means 70 (FIG. 6) has a base 76, a winding head 77 rotatably mounted on base 76, and an opening 78 to accommodate elongated core 69 as it passes through winding means 70. Winding head 77 is rotated in a clockwise direction as shown by the arrow in (FIG. 6) by a drive means (not shown) about an axis of rotation extending parallel to the predetermined line along which core 69 is advanced. A supply package 79 of adhesive tape 71 is coaxially mounted adjacent face 80 on winding head 77. Face 80 is a planar surface perpendicular to the axis of rotation of winding head 77. Adhesive tape 71 is separated from supply package 79 by guide member 81, which projects outwardly from face 80 on the periphery of winding head 77. The rotation of winding head 77 and guide member 81 spirally wraps adhesive tape 71 around core 69. The speed of rotation of winding head 77 and the forward speed of elongated core 69 through opening 78 determines the helical angle of the spiral winding. The adhesive tape 71 maybe wound with or without each turn of adhesive tape overlapping the preceding turn of adhesive tape.

Elongated core 69 having a spiral wrapping of adhesive tape 71 is advanced linearly through winding means 74. Winding means 74 has a base 82, a winding head 83 rotatably mounted on base 82, and an opening 84 therein to accommodate the elongated core 69 advancing therethrough. Winding head 83 is rotated in a counterclockwise direction by a drive means (not shown). An insulating tape supply means 85 is coaxially mounted around opening 84 adjacent face 86 of winding head 83 to supply insulating tape 74 for wrapping around the core 69. Face 86 of winding head 83 is a planar surface perpendicular to the axis of rotation of winding head 83. A guide member 87 which is mounted on face 86 of winding head 83 projects outwardly from the face 86 on the periphery of winding head 83 to separate insulating tape 75 from tape supply 85 and to spirally wrap insulating tape 75 around elongated core 69 and adhesive tape 71. Insulating tape 75 can be wrapped with a portion of each turn of tape 75 overlapping a portion of the preceding turn. Insulating tape 75 is spirally wrapped around the layer of adhesive tape 71 in a direction of rotation opposite to that of the spiral wrapping of adhesive tape 71 in order that a portion of each turn of tape 75 contacts adhesive surface 72 of adhesive tape 71. The helical angle of wrapping is determined by the rotational speed of winding head 83 and the rate of linear advance of core 69 through opening 84.

Winding means 74 may have a tape supply of insulating tape having a plurality of tapes mounted adjacent face 86 of winding head 83. A plurality of guide means are mounted on face 86 circumferentially spaced apart about the periphery of winding head 83 to separate each tape from the tape supply at a predetermined location and spirally wrap the tapes around core 69 and adhesive tape 71.

Figure 7:
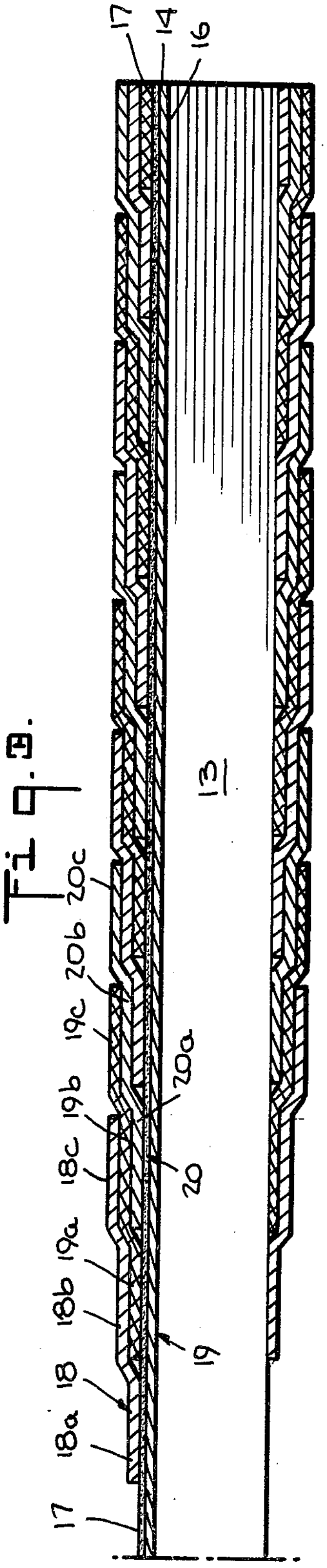
FIG. 7 is a vertical section view taken along the length of the conductor shown in FIG. 6.

A transverse section of conductor 68 of FIG. 6 is shown in FIG. 7. Core 69 is shown with adhesive tape 71 spirally wrapped around the outside surface 88 of core 69. Non-adhesive surface 73 of adhesive tape 71 is adjacent to outer surface 88 of core 69. Spirally wrapped around adhesive tape 71 is insulating tape 75.

Adjacent turns 89 and 90 of insulating tape 75 overlap. Turns 89 and 90 have portions 89*a*, 89*b* and 90*a*, 90*b*, respectively. Insulating tape 75 is spirally wound in an overlapping manner with the result that portions 89*a* and 90*a* are in contact with adhesive surface 72 of adhesive tape 71. Portion 89*b* overlies adjacent portion 90*a*. Adhesive tape 71 can be spirally wound about core 69 with gaps 91 between adjacent turns of adhesive tape 71. In this construction, the insulating tape 75 wrapped around core 69 is not bound to the core 69, but rather is bound to adhesive tape 69. The adhesive tape 71 has a non-adhesive surface 73 immediately adjacent the core surface 88 with gaps 91 between adjacent turns of adhesive tape 71 to allow adhesive tape 71 to shift upon the surface 88 of core 69 when it is bent. Thus, the insulating layer can shift to accommodate curved surfaces of a bent core 69 without cracking or exposing the elongated core. Since the spiral of adhesive tape 71 and the spiral of insulating tape 75 have different directions of rotation, every turn of insulating tape 75 contacts adhesive layer 72 of adhesive tape 71 which will keep insulating tape 75 in its spiral orientation. If insulator 68 is cut, the spiral of insulating tape 75 does not unwrap since the insulating tape is retained in its spiral orientation by contact with adhesive tape 71.

Figure 10:
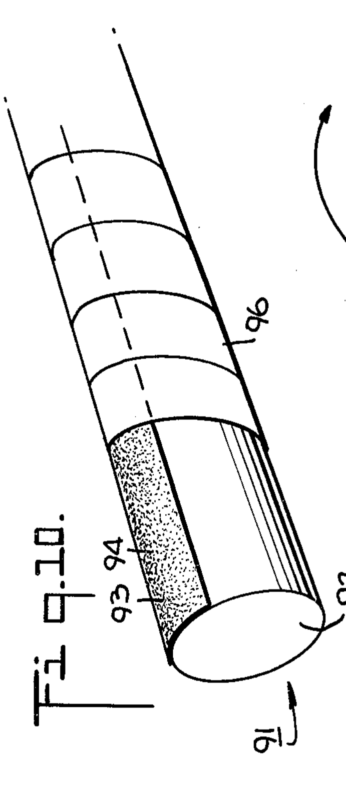
FIG. 10 is a perspective of an electrical conductor with conductor core having a circular cross-section, an adhesive tape and a spirally wrapped insulating tape.

FIG. 10 shows conductor 91 of the first embodiment of the invention having core 92 with a circular cross-section. An adhesive tape 93 having an adhesive surface 94 and a non-adhesive surface 95 is applied to core 92 with the adhesive surface 94 facing opposite core 92. An insulating tape 96 is spirally wrapped around core 92 and adhesive tape 93 in order that each turn of insulating tape 96 partially overlaps the preceding turn and a portion of each turn contacts adhesive surface 94 of adhesive tape 93. Conductor 91 has the same advantages as conductor 12 seen in FIG. 1.

Figure 11:
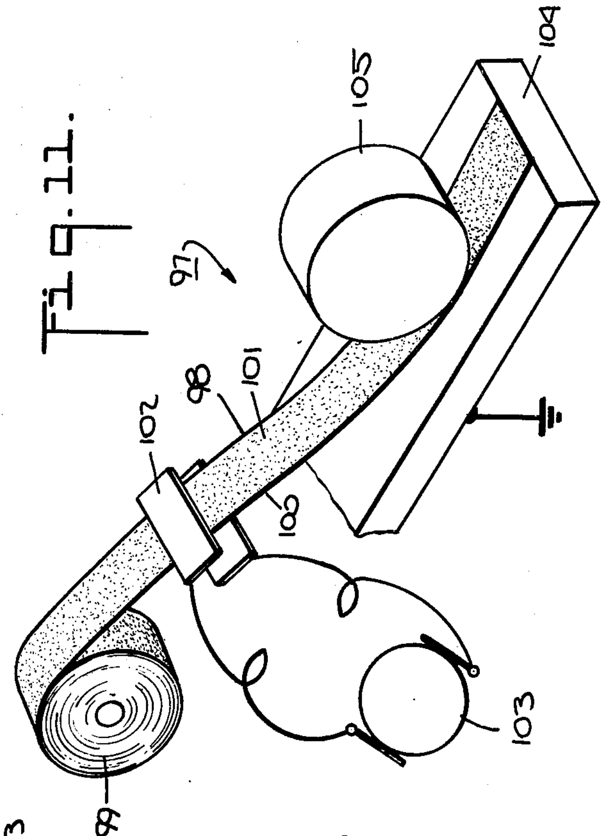
FIG. 11 is a fragmentary perspective view showing an apparatus for applying a static charge to adhesive tape to be applied to a conductor core according to the invention.

FIG. 11 is a schematic drawing of an electrostatic charge means 97 to impart an electrostatic charge to adhesive tape in order to cause the adhesive tape to adhere to the conductor during wrapping. The adhesive tape 98 is taken from an adhesive tape supply means 99 such as a roll. Adhesive tape 98 has a non-adhesive surface 100 which is placed upon the core and an adhesive surface 101. The adhesive tape 98 is passed through a pair of electrodes 102 attached to an electrostatic charge generator 103 in order to place an electrostatic charge thereon. The electrostatically charged adhesive tape 98 is then applied to a grounded conductor core 104 with non-adhesive surface 100 contacting the core 104 by a roller 105. As the charged adhesive tape 98 contacts conductor core 104, it is held in place by the electrostatic charge during wrapping with the insulating tape. The electrostatic charge means can be used with the apparatus shown in FIGS. 1 and 6 to charge the adhesive tape for causing it to adhere to the core.

What is claimed is:

1. A wrapped elongated structure comprising: an elongated core; a tape means positioned in a predetermined condition along the length of the core and having a first and second surface, the first surface thereof disposed in contact with the elongated core being non-adhesive and the second surface thereof opposite the elongated structure being adhesive; and a tape wrapping means positioned in a predetermined spiral condition about the elongated core and the adhesive tape means with each turn of the tape wrapping means being in contact with the second adhesive surface of the adhesive tape means, the predetermined position of the tape means being independent of the predetermined position of the tape wrapping means, whereby the tape wrapping means permanently encases the structure and will not unravel yet is able to move with respect to the surface of the structure when it is bent about a radius.

2. A wrapped elongated structure in accordance with claim 1 in which a first portion of each turn of the tape wrapping means overlaps a portion of the preceding turn of the tape wrapping means and a second portion of each turn of the tape wrapping means contacts the second adhesive surface of the adhesive tape means.

3. A wrapped elongated structure in accordance with claim 1 in which the adhesive tape means extend substantially parallel to the length of the elongated core.

4. A wrapped elongated structure in accordance with claim 1 in which the adhesive tape means is a resin material having a pressure sensitive adhesive on the second surface thereof.

5. A wrapped elongated structure in accordance with claim 1 in which the tape wrapping means comprises a plurality of tapes, each of the tapes contacting the second tape surface of the adhesive tape means on each turn of each of the tapes about the elongated core and the adhesive tape means.

6. A wrapped elongated structure in accordance with claim 1 in which the elongated core comprises an electrically conductive core means and the tape wrapping means comprises electrical insulating tape means.

7. A wrapped elongated structure in accordance with claim 5 in which the elongated core comprises an electrically conductive core and each of the plurality of tapes of the tape wrapping means comprises electrical insulating tape means.

8. A wrapped elongated structure comprising: an elongated core; a first tape wrapping means spirally wrapped around the exterior of the elongated core; an adhesive tape means overlapping the first tape wrapping means and extending substantially parallel to the length of the elongated core, the adhesive tape means having a first adhesive surface in contact with each turn of the first tape wrapping means about the elongated core and having a second adhesive surface opposite the first adhesive surface; and a second tape wrapping means spirally wrapped about the elongated core, the first tape wrapping means, and the adhesive tape means, whereby the first tape wrapping means, adhesive tape means and second tape wrapping means permanently encase the elongated structure and will not unravel yet are able to move with regard to the surface of the structure when it is bent about a radius.

9. A wrapped elongated structure in accordance with claim 8 in which: a portion of each turn of the first tape wrapping means about the elongated core overlapping a portion of the preceding turn of the first tape wrapping means; and a first portion of each turn of the second tape wrapping means overlapping a portion of the preceding turn of the second tape wrapping means and a second portion of each turn of the second tape wrapping means being in contact with the second adhesive surface of the adhesive tape means.

10. A wrapped elongated structure in accordance with claim 8 in which the adhesive tape means is a resin material having a pressure sensitive adhesive on the first and the second adhesive surfaces.

11. A wrapped elongated structure in accordance with claim 8 in which: the first tape wrapping means comprises a plurality of first tapes each contacting the first adhesive surface of the adhesive tape means on each turn about the elongated core; and the second tape wrapping means comprises a plurality of second tapes each contacting the second adhesive surface of the adhesive tape means on each turn about the elongated core, the first tape wrapping means, and the adhesive tape means.

12. A wrapped elongated structure in accordance with claim 8 in which: the elongated core comprises an electrically conductive core means; the first tape wrapping means comprises an electrical insulating tape means; and the second tape wrapping means comprises an electrical insulating tape means.

13. A wrapped elongated structure comprising: an elongated core; an adhesive tape means having at least one adhesive surface spirally wrapped about the elongated core with the adhesive surface facing away from the elongated core and a tape wrapping means wrapped around the elongated core and the adhesive tape means, the tape wrapping means being spirally wrapped in a sense of rotation opposite the sense of rotation of the adhesive tape means, each turn of the tape wrapping means contacting the adhesive surface of the adhesive tape means, whereby the adhesive tape means and tape wrapping means permanently encase the elongated structure and wil not unravel yet are able to move with respect to the surface of the structure when it is bent about a radius.

14. A wrapped elongated structure in accordance with claim 13 in which the tape wrapping means comprises a plurality of tapes, each of the tapes contacting the adhesive surface of the adhesive tape means on each turn of each of the tapes about the elongated core and the adhesive tape means.

15. A wrapped elongated structure in accordance with claim 13 in which a first portion of each turn of the tape wrapping means overlaps a portion of the preceding turn of the tape wrapping means and a second portion of each turn of the tape wrapping means contacts the adhesive surface of the adhesive tape means.

16. A wrapped elongated structure in accordance with claim 13 in which the said elongated core comprises an electrically conductive core means and the tape wrapping means comprises electrical insulating tape means.

* * * * *